Figure 1:
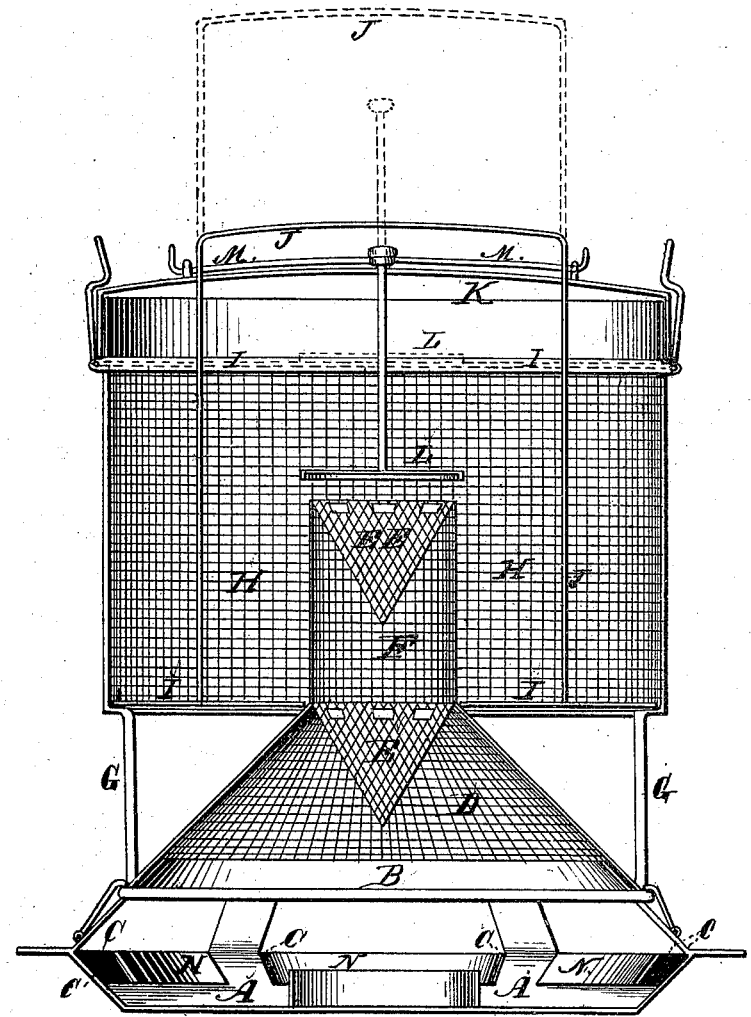
Figure 2:
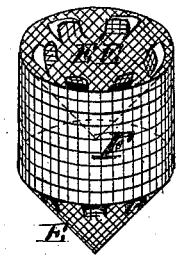

J. R. JOHNSON.
Fly-Traps.

No. 141,931.

Patented August 19, 1873.

Witnesses.
Ja. S. Morton
Henry H. Kidd

Inventor:
Jesse R. Johnson

UNITED STATES PATENT OFFICE.

JESSE R. JOHNSON, OF BENTON HARBOR, MICHIGAN.

IMPROVEMENT IN FLY-TRAPS.

Specification forming part of Letters Patent No. 141,931, dated August 19, 1873; application filed March 29, 1873.

*To all whom it may concern:*

Be it known that I, JESSE R. JOHNSON, of Benton Harbor, in the county of Berrien and State of Michigan, have invented a new and useful Improvement in Fly-Traps; and do declare that the following is a true and accurate description thereof, reference being had to the accompanying drawing, and to the letters of reference marked thereon, and being a part of this specification.

The nature of this invention relates to an improved construction of fly-traps, as follows, and described more particularly as consisting of a feed-plate, marked A, carrying a raised part, B, having slots C, which form passages for the fly. Upon the raised part B rests an obtuse cone, D, attached to it by means of hooks, or hooks and hinge, and having affixed in its upper and smaller end a small reversed cone, E, leaving small slots at the point of its connection with the larger cone D, of which it is a part; also, in connection with and upon the upper or small end of said cone D is placed a tube or pipe, F, of equal size with the small end of the cone D, and reaching about half-way to the top of the main body of the trap, having in its upper end another small reversed cone, E E; and upon the lower or larger part of the cone D are affixed supports G G, upon the upper end of which is affixed the cup or vessel H, forming the main body of the trap, having a movable bottom, I, furnished with a circular hole in its center, so as to let the tube F pass through. The bail or handle J is so constructed that it passes through the cover K, and is made fast to the movable bottom I; and in the center of cover K is suspended a small movable cover, L, so as to coincide with the circular opening in the movable bottom I, and to cover the opening whenever the bottom I is drawn up to the lower edge of the cover K by means of the handle J. The movable bottom I is held firmly in its place at the bottom of the cup or vessel H, and also when raised to the lower edge of the cover K for the purpose of collecting the flies into the cover K; by the springs M placed on the cover K, and so arranged so as to engage with the handle J by means of suitable notches or catches in the same.

By reference to the slots C in the raised part B of the feed-plate A, it will be seen that there are short covered ways leading downward and into the plate, constructed of perforated tin at the bottom and plate-tin at the top and end, said covered ways being marked N; the whole being constructed of plate-tin, wire, and perforated tin or wire-cloth, or other suitable material.

What I claim as my invention, and desire to secure by Letters Patent, is—

1. The raised part B, in connection with plate A and the short covered ways N, in combination with the supports G G and cup H, as constructed and arranged.

2. The obtuse cone D, the small reversed cone E, the tube or pipe F, and the small reversed cone E E, the supports G G, the cup or vessel H, the movable bottom I, the bail or handle J, the cover K, and the small movable cover L, and also the springs M, to be constructed substantially as described, and for the purpose hereinbefore set forth.

JESSE R. JOHNSON.

Witnesses:
JAS. S. MORTON,
HENRY H. KIDD.